United States Patent [19]

Mizuno et al.

[11] 4,220,059
[45] Sep. 2, 1980

[54] SPEED RATIO CONTROL SYSTEM FOR STEPLESS TRANSMISSION OF VEHICLES

[75] Inventors: Kiyofumi Mizuno, Nagoya; Hiroaki Maeda, Toyota; Shigeo Takahashi, Kariya; Masanori Sato; Satomi Suzuki, both of Nagoya, all of Japan

[73] Assignee: Aishin Seiki Kabushiki Kaisha, Kariya, Japan

[21] Appl. No.: 961,068

[22] Filed: Nov. 15, 1978

[30] Foreign Application Priority Data

Nov. 21, 1978 [JP] Japan .................................. 53-139679

[51] Int. Cl.² ........................ B60K 41/18; F02B 3/00
[52] U.S. Cl. ........................................ 74/865; 74/866
[58] Field of Search ................................ 74/856–860, 74/865, 866, 867, 868; 123/198 F, 32 EA

[56] References Cited

U.S. PATENT DOCUMENTS

| | | | |
|---|---|---|---|
| 4,015,488 | 4/1977 | Akeson et al. | 74/866 |
| 4,061,055 | 12/1977 | Iizuka et al. | 74/859 X |
| 4,106,367 | 8/1978 | Bouvet | 74/866 |
| 4,107,776 | 8/1978 | Beale | 74/866 X |

Primary Examiner—C. J. Husar
Assistant Examiner—Frank McKenzie
Attorney, Agent, or Firm—Sughrue, Rothwell, Mion, Zinn and Macpeak

[57] ABSTRACT

A speed ratio control system for a stepless variable speed transmission of vehicles having an electronic fuel injection control system. A speed ratio control signal for controlling the speed ratio of the stepless variable speed transmission is produced from the output fuel injection control signal from the electronic fuel injection control system and a target fuel injection quantity signal from an electronic arithmetic unit which generates the target fuel injection quantity signal in response to a throttle opening indication signal. The output fuel injection control signal is compared with the target fuel injection quantity signal to generate the speed ratio control signal which controls the speed ratio of the stepless variable speed transmission until the fuel injection indicated by the fuel injection from the electronic fuel injection system becomes equal to the target fuel injection quantity.

6 Claims, 7 Drawing Figures

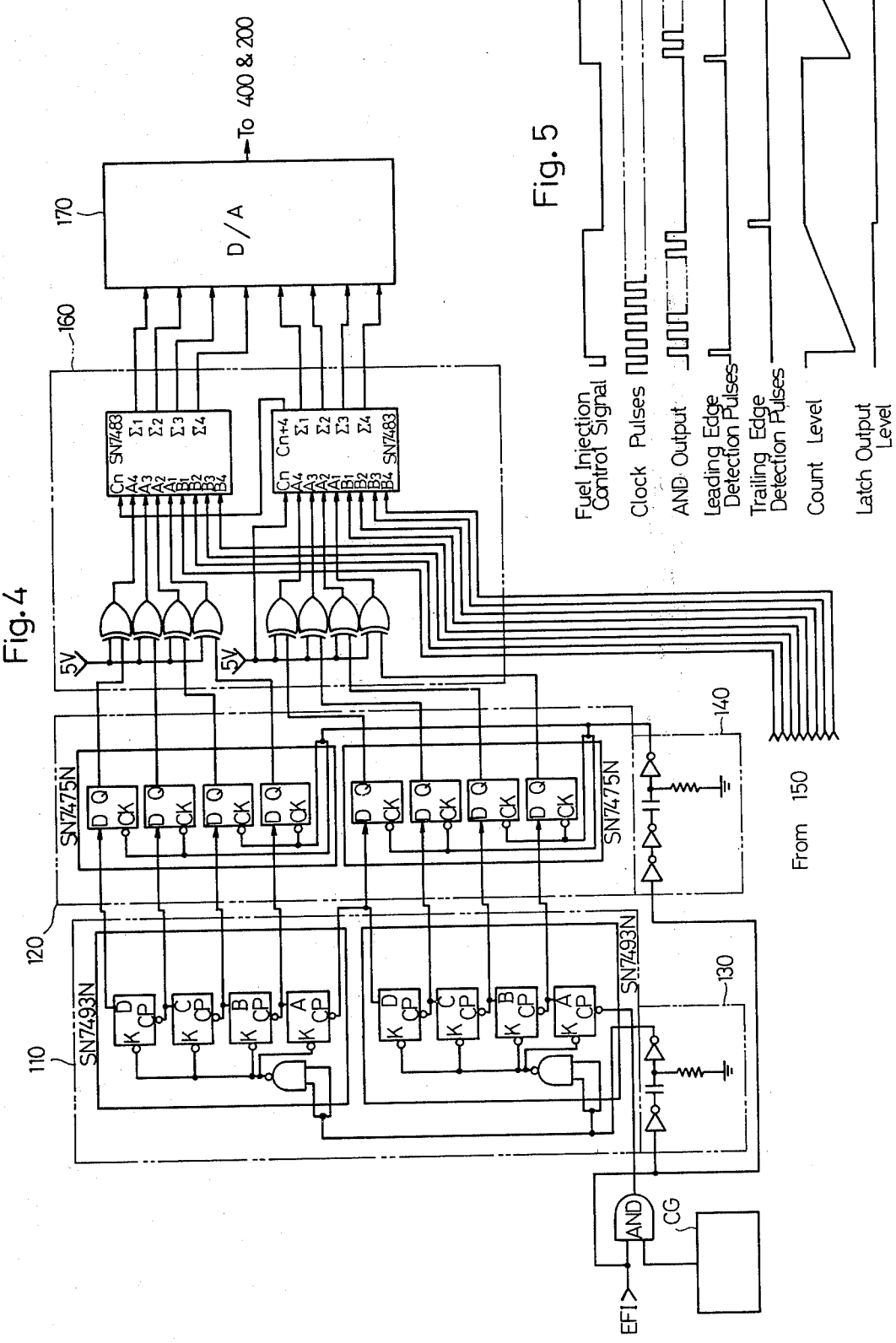

SPEED RATIO CONTROL SYSTEM FOR STEPLESS TRANSMISSION OF VEHICLES

BACKGROUND OF THE INVENTION

The invention relates to a speed ratio control system which may be used in a vehicle having a stepless variable speed transmission to control the speed ratio of the transmission automatically in order to place the engine under a given operating condition in accordance with a change in the running conditions.

The operating condition of an engine mounted on a vehicle varies extensively depending on a change in the degree of opening of a throttle valve which is initiated by the acceleration or deceleration control by a driver, varying road resistances, windage losses or the like. On the other hand, to accommodate for the regulation on the exhaust gas or to reduce the fuel cost, it is desirable that the engine be operated under a given condition. In the prior art practice, a given operating condition of an engine mounted on a vehicle having a stepless variable speed transmission is established by controlling the transmission ratio of the stepless transmission.

When controlling the transmission ratio in this manner, the operating condition of the engine is detected by a rotational speed $n_1$ of the engine which corresponds to a throttle opening $\Theta$, and the transmission ratio of the stepless transmission is controlled so as to achieve a desired rotational speed of the engine. Sensors which detect the throttle opening and the rotational speed of the engine can be readily installed, and hence the resulting speed ratio control system can be constructed in a relatively simple manner. However, when a torque from the engine changes, a corresponding rotational speed of the engine is established with certain time delay, so that the control of the transmission ratio is delayed with respect to a change in the torque. However, it is desirable that the transmission ratio be controlled so as to correspond to the torque from the engine. However, there is no inexpensive and stable instrumentation available which permits a measurement of the torque from the engine to be conducted on the vehicle.

SUMMARY OF THE INVENTION

The invention has for its object the achievement of an automatic control of the speed ratio of a stepless variable speed transmission associated with a vehicle in accordance with a fuel injection which is substantially proportional to the torque from the engine so that the transmission ratio rapidly follows a change in the load on the engine to establish a given operating condition thereof.

Recently, an electronic fuel injection system (referred to hereinafter as EFI) is mounted on almost all of vehicles in order to accommodate for an exhaust gas regulation (e.g. U.S. Pat. No. 3,855,795). Therefore it is a simple matter to derive an electrical signal indicative of a fuel injection. In view of the fact that the fuel injection is substantially proportional to a torque from the engine, an output signal from EFI which represents a fuel injection is utilized in accordance with the invention as a substitute for an indication of the torque to control the speed ratio so that the torque from the engine reaches a target torque value.

This eliminates the need for the provision of a special instrumentation which determines a torque from the engine, but a simple control circuit may be used to control the speed ratio or the load on the engine so that a desired operating condition of the engine, as set by the target value established by EFI, can be achieved. In this manner, the inherent effect of EFI itself which acts to reduce the toxious components contained in the exhaust gas, combined with the reduction of the toxious components which results from a stabilized operation of the engine achieved by controlling the speed ratio to establish the target operating condition of the engine, accomplishes a highly efficient and stabilized reduction of the toxious components contained in the exhaust gas. It is also possible to control the speed ratio is consideration of the fuel cost or the operating capability.

BRIEF DESCRIPTION OF THE DRAWINGS

FIG. 4 is a more detailed diagram of the digitizer and the adder-subtractor shown in FIG. 3;

FIG. 5 is a timing chart illustrating the operation of the digitizer;

FIG. 5 is a circuit diagram of the polarity inverter shown in FIG. 3; and

DESCRIPTION OF PREFERRED EMBODIMENT

Figure 1:
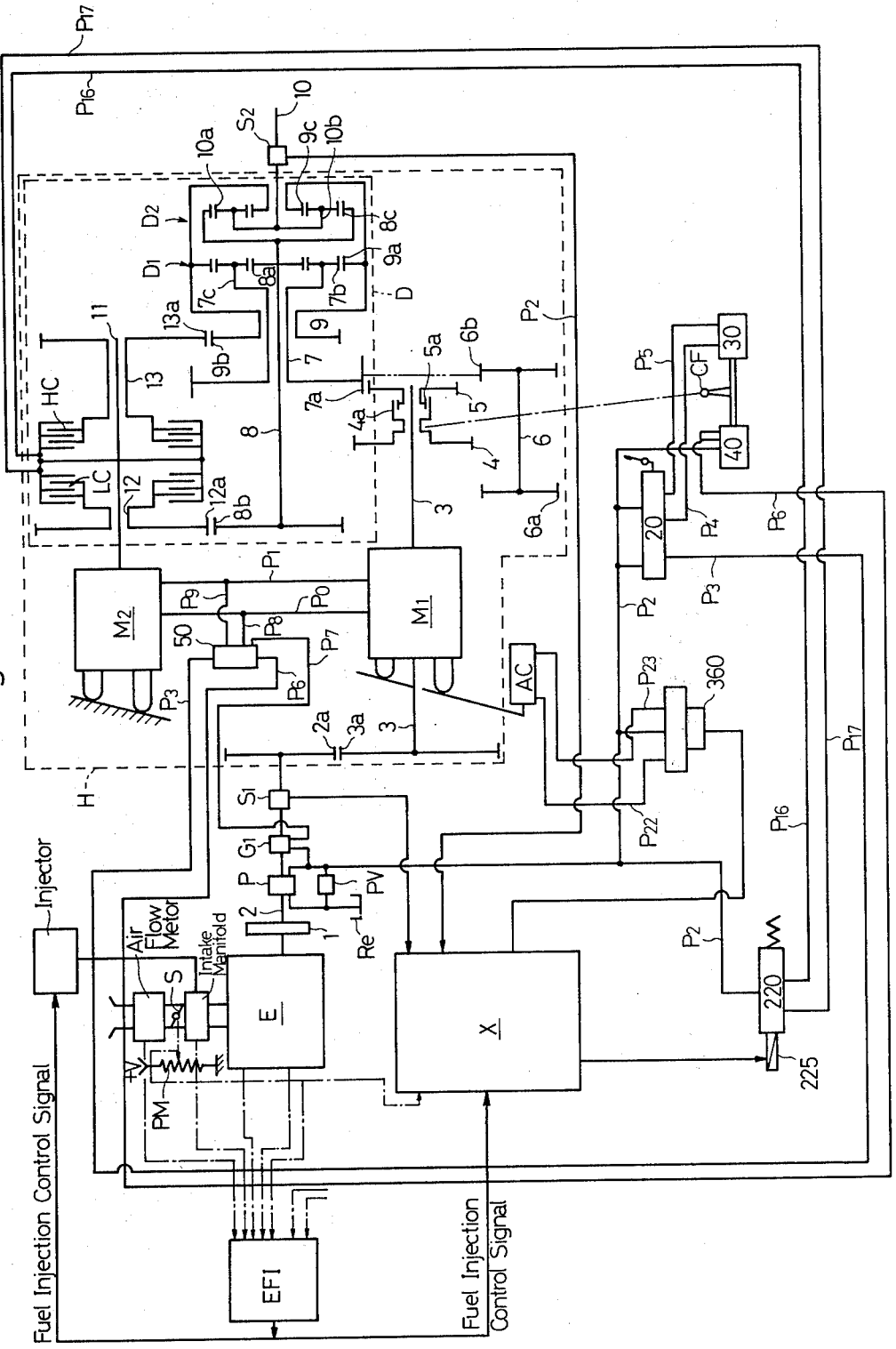
FIG. 1 is a schematic diagram of the overall arrangement of one embodiment of the invention.
Figure 2:
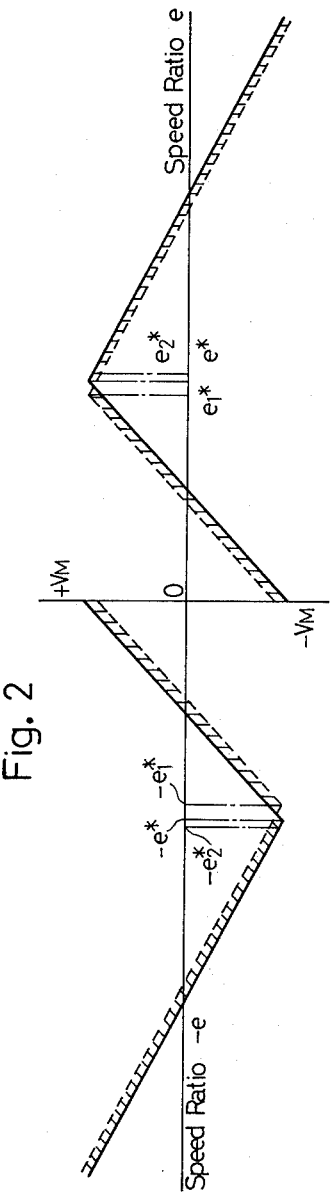
FIG. 2 graphically shows the relationship between the discharge volume of a first hydraulic pump motor and the speed ratio of a hydro-mechanical variable speed transmission.

Referring to FIG. 1, an engine E is connected through a flywheel 1 to an input shaft 2 of a hydro-mechanical transmission H. Connected with the input shaft 2 is a hydraulic pump P which cooperates with a relief valve PV to supply a given line pressure to an oil path $P_2$. Also connected with the input shaft 2 is a governor valve $G_1$ which adjusts the line pressure to a value which depends on the rotational speed of the engine E for supply to an oil path $P_7$. A gear 2a is fixedly mounted on the right-hand end of the input shaft 2, and meshes with a gear 3a fixedly mounted on the rotary shaft 3 of a first hydraulic pump motor $M_1$ of variable displacement type. A gear 4 is splined to the shaft 3 so as to be slidable axially and carries on its right-hand end a dog gear 4a, which can be driven in the lateral direction by a forward reverse shifting fork CF. In its right-hand position, the dog gear 4a can mesh with a dog gear 5a on a gear 5 which is rotatably mounted on the shaft 3. In its right-hand end position, it meshes with a left-hand gear 6a on a reverse shaft 6. The gear 5 and a right-hand gear 6b on the reverse shaft 6 are maintained in meshing engagement with a gear 7a on an intermediate shaft 7 which forms part of a differential gearing D. The differential gearing D includes a first epicyclic gearing $D_1$ and a second epicyclic gearing $D_2$. The first epicyclic gearing $D_1$ includes a sun gear 8a which is fixedly mounted on a first reaction shaft 8, on the left-hand end of which is fixedly mounted a gear 8b which meshes with an output gear 12a of a low range clutch LC. A ring gear 8c of the second epicyclic gearing $D_2$ is fixedly mounted on the right-hand end of the first reaction shaft 8. The first epicyclic gearing $D_1$ also includes a ring gear 9a which is fixedly mounted on a second reaction shaft 9 which is in turn rotatably mounted on the intermediate shaft 7. A gear 9b is fixedly mounted on the left-hand end of the second reaction shaft 9 and meshes with an output gear 13a of a high range clutch HC. A sun gear 9c of the second epicyclic gearing $D_2$ is fixedly mounted on the right-hand end of the second reaction shaft 9. The first epicyclic gearing $D_1$ also includes a planet gear 7b rotatably mounted on a carrier 7c which is located on the right-hand end of the intermediate shaft 7 which is in turn rotatably mounted on the first reaction shaft 8. The second epicyclic gearing $D_2$ includes a planet gear 10a which is rotatably mounted on a carrier 10b located on the left-hand end of an output shaft 10. A second hydraulic pump motor $M_2$ of a fixed displacement type is connected with the first pump motor $M_1$ through oil paths $P_o$ and $P_1$ and includes a rotary shaft 11 on which the low range and the high range clutch LC, HC are mounted. The low range clutch LC has an output shaft 12 which is rotatably mounted on the rotary shaft 11 and which rotates integrally therewith in response to the line pressure of an oil path $P_{17}$. Similarly, the high range clutch HC has an output shaft 13 which is rotatably mounted on the rotary shaft 11 and which rotates integrally therewith in response to the line pressure of an oil path $P_{16}$.

With the hydro-mechanical transmission H, when the dog gears 4a, 5a are brought into meshing engagement with each other and either low range or high range clutch LC or HC is actuated, the output shaft 10 can be rotated in the same direction as the input shaft 2. Conversely, when the gears 4, 6a are brought into meshing engagement with each other, the actuation of either clutch LC or HC rotates the output shaft 10 in the opposite direction from the input shaft 2. The meshing engagement between the dog gears 4a, 5a combined with the actuation of the low range clutch LC represents a status of transmission in the low speed ratio region in the forward direction while the meshing engagement between the dog gears 4a, 5a combined with the actuation of the high range clutch HC represents a status of transmission in the high speed ratio region in path $P_2$, respectively.

An actuator 30 is connected with paths $P_4$ and $P_5$ for shifting the forward/reverse shifting fork CF in the lateral direction. When the valve 20 shifts to its forward position to supply the line pressure to path $P_4$, the actuator 30 responds thereto by moving the gear 4 to its right-hand end position through the fork CF, thus bringing the dog gear 4a into meshing engagement with dog gear 5a. When the valve 20 shifts to the reverse position to supply the line pressure to path $P_5$, the actuator 30 brings the gear 4 to its left-hand end position through fork CF, thus causing it to mesh with gear 6a. A valve 40 mounted on the left-hand end of fork CF provides a temporary communication between paths $P_6$ and $P_2$ during the stroke of the gear 4 between its end positions.

A bypass clutch valve 50 is connected with paths $P_3$, $P_6$ and $P_7$ for enabling or disabling a communication between path $P_8$ connected with path $P_o$ and path $P_9$ connected with path $P_1$. In the neutral position of the valve 20 when the line pressure is supplied to path $P_3$, a communication is established between paths $P_8$ and $P_9$ to establish a neutral condition of the transmission H. A communication between paths $P_8$ and $P_9$ is also established during the idling of the engine E and when the line pressure is not supplied to path $P_6$. However, when the line pressure is supplied to path $P_6$, the communication between paths $P_8$ and $P_9$ is interrupted. The communication between these paths is also interrupted when no line pressure is supplied to path $P_3$ and the rotational speed of the engine E is higher than the idling speed.

The detailed construction of the manual shift valve 20, actuator 30, valve 40 and bypass clutch valve 50 is disclosed in Japanese Laid-Open Patent Application No. 93,869/1977.

A speed ratio control system will now be described which controls the speed ratio by controlling the supply of a hydraulic oil to the actuator AC and the supply of a hydraulic oil to the low range clutch LC and high range clutch HC. In the embodiment shown in FIG. 1, it comprises a control circuit X and a servo valve 360.

Figure 3:
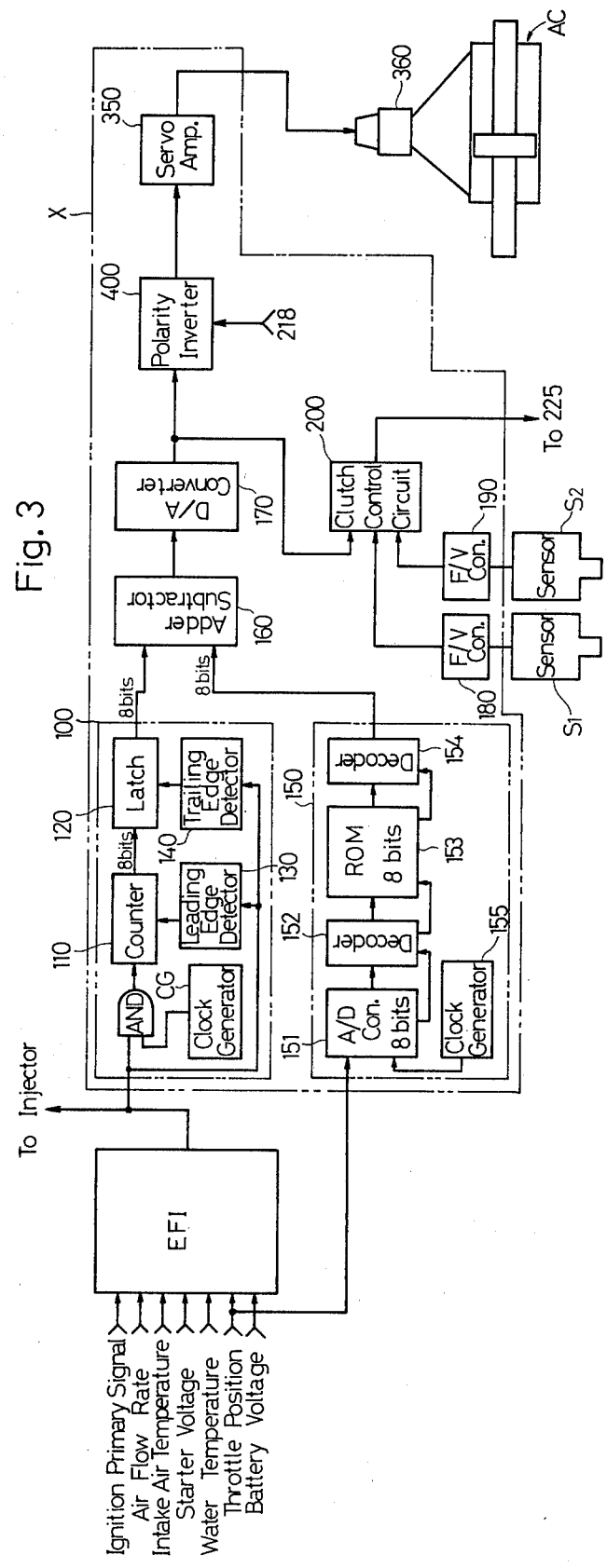
FIG. 3 is a block diagram of the control circuit shown in FIG. 1.

The control circuit X is more specifically shown in FIG. 3. It comprises a digitizer 100 which responds to an electrical output signal from EFI to produce a digital code which represents an actual duration of the fuel injection, a target function generator 150 which produces a target fuel injection duration in the form of a digital code corresponding to a given throttle position Θ, an adder-subtractor 160 which produces an encoded difference between the actual and the target duration of the fuel injection, a D/A converter 170, a clutch control circuit 200 which controls the operation of clutches HC and LC, a polarity inverter 400 which inverts the output polarity from the D/A converter 170 in accordance with the forward or reverse direction of running of the vehicle, and a servo amplifier 350.

The digitizer 100 includes an AND gate which is enabled or opened when the fuel injection signal from the EFI mounted on the engine E assumes a high level or "1" (of at a fuel injection command level), whereby an output pulse from a clock pulse generator CG is passed therethrough to be applied to a binary counter 110. The counter 110 is cleared by an output pulse from a leading edge detector 130 which is produced when the fuel injection signal rises to a high level or "1", and initiate to count up the output pulses from the AND gate from zero. When the fuel injection signal reverts to a low level or "0", the AND gate is disabled or closed to stop the up counting by the counter 110. Simultaneously, an output pulse from a trailing edge detector 140 operates to sample the count therein into a latch 120, thus updating its output. The output of the latch 120 represents the number of clock pulses which are passed during the time the fuel injection signal assumes its high level, or the duration of the fuel injection, in a digital code, and is fed to the adder-subtractor 160.

On the other hand, the target function generator 150 includes an A/D converter 151 which converts an analog signal indicative of the throttle position Θ into a digital code, which is then passed through a decoder 152 to read a target fuel injection duration code corresponding to the throttle position Θ from a read-only memory 153 through a decoder 154. The duration code is also fed to the adder-subtractor 160. The adder-subtractor 160 operates to derive a complement of the actual fuel injection duration code from the digitalizer 100 and adds it with the target fuel injection duration code obtained from the target function generator, thus producing an output code which represents the target fuel injection duration minus the actual fuel injection duration. The difference code is fed to the D/A converter 170 to be converted into an analog value, which is then applied to the clutch control circuit 200 and the polarity inverter 400.

FIG. 4 shows a specific example of the digitizer 100 and the adder-subtractor 160. The leading edge detector 130 of the digitalizer 100 comprises a pair of NOT gates, a capacitor and a resistor. The trailing edge detector 140 comprises three NOT gates, a capacitor and a resistor. The counter 110 is formed by a pair of four bit binary counters IC which may be ones available under the trademark of SN7493N from Texas Instruments, Inc. The latch 120 includes a pair of four bit bistable latches which may be available under the trademark of SN7495N from Texas Instruments, Inc. The timing of operation of these components is illustrated graphically in FIG. 5. It should be noted that while the count and the latch output are in the form of digital codes, they are shown in a corresponding analog form in FIG. 5 for the purpose of convenience.

The adder-subtractor 160 comprises eight exclusive OR gates which cooperate together to convert the count from the counter 110 into its complement, and a pair of four bit full adders which may be available under the trademark of SN7483 from Texas Instruments, Inc., for example. The output code from the adder-subtractor 160 represents a deviation of the actual fuel injection duration from the target duration, and is converted into an analog signal by the D/A converter 170 and then applied to the polarity inverter 400 and the clutch control circuit 200.

Figure 6:
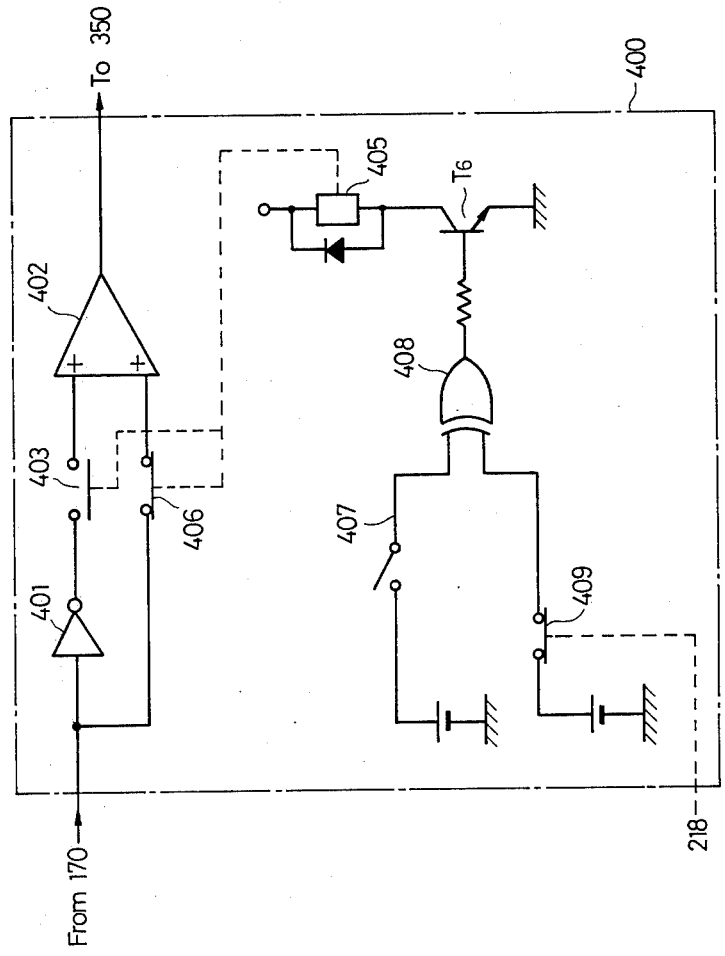
Figure 7:
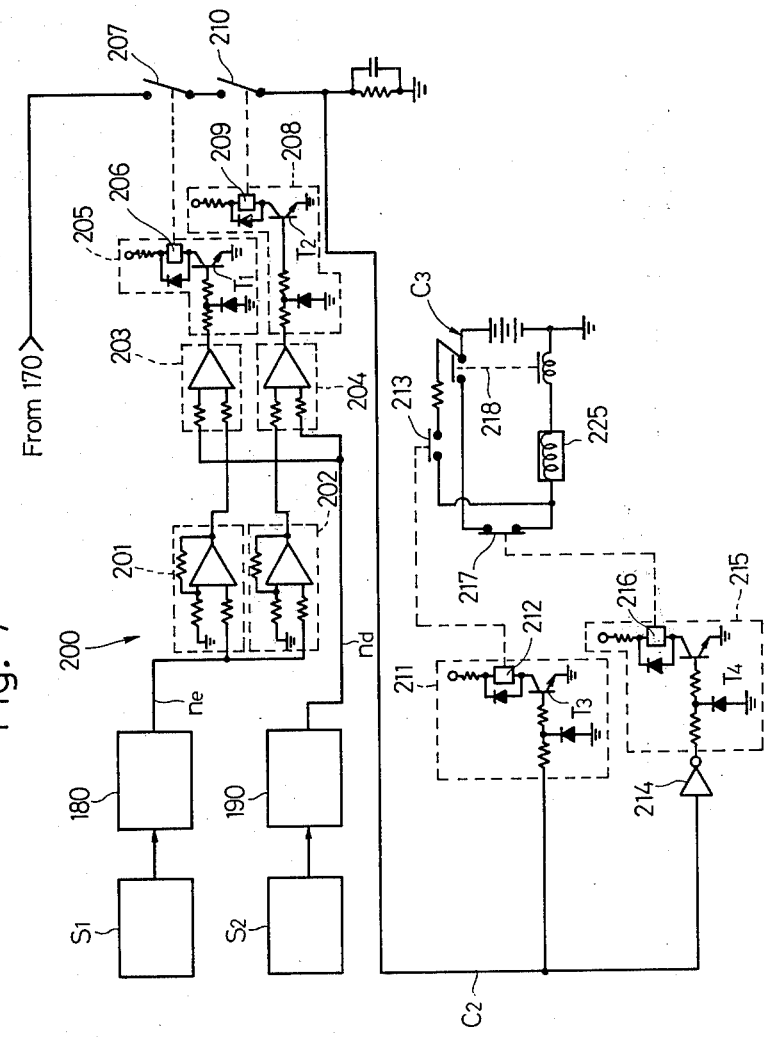
FIG. 7 is a circuit diagram of the clutch control circuit shown in FIG. 3.

FIG. 6 shows the detail of the polarity inverter 400. It includes an inverter 401 which is connected with the output of the D/A converter 170 to invert its polarity, and a pair of normally open contact 403 and a normally closed contact 406 which are driven by a reed relay 405. The inverter output from the inverter 401 is supplied through contact 403 to one input of an adder 402 while the direct output of the D/A converter 170 is supplied through contact 406 to the other input of the adder 402. The reed relay 405 is driven in response to the conduction of a transistor T6, which is rendered conductive through an exclusive OR circuit 408 in response to the closure of only one of a switch 407 which is closed only when manual shift valve 20 is shifted to its forward position and a normally closed contact 409 which is opened only when the high range clutch HC is operated in response to an electromagnetic switch 218 contained in the clutch control circuit 200, the detail of which is shown in FIG. 7. When the manual shift valve 20 is shifted to its forward position and the low range clutch LC is operated or when the valve is shifted to its reverse position and the high range clutch HC is operated, the transistor T6 remains non-conductive. Hence, the normally closed contact 406 remains closed while the normally open contact 403 remains open, thus feeding the output of the D/A converter 170 directly to the servo amplifier 350. When the manual shift valve 20 is shifted to its forward position and the high range clutch is operated or when it is shifted to the reverse position and the low range clutch LC is operated, transistor T6 is rendered conductive to close the normally open contact 403 and to open the normally closed contact 406, whereby the output of the D/A converter 170 is reversed in polarity before it is supplied to the servo amplifier 350. It should be noted that output terminal of adder 402 is connected with the ground when the normally open contact 403, normally closed contacts 406, 409 and switch 407 are opened.

In response to a potential of zero level applied thereto, the servo valve 360 isolates oil paths P22 and P23 of the actuator AC from oil path P2 and reservoir Re, respectively. In response to a negative potential applied thereto, the servo valve establishes a communication between oil paths P23 and P22 on one hand and oil path P2 and reservoir Re, respectively, and the degree of communication depends on the magnitude of the negative potential applied. In response to a positive potential applied thereto, the servo valve communicates the oil paths P22 and P23 with oil path P2 and reservoir Re, respectively, and the degree of communication depends on the magnitude of the positive potential.

A solenoid valve 220 which is controlled by the clutch control circuit 200 is normally spring biased to assume a first position in which the oil path P17 communicates with oil path P2 and the oil path P16 communicates with reservoir Re. However, when the solenoid 225 is energized, a communication is established between the oil paths P16 and P2 and between the oil path P17 and reservoir Re. The clutch control circuit 200 is more specifically shown in FIG. 7. It comprises a multiplier 201 which multiplies the positive potential $n_e$ (a positive potential which is produced by the rotation of the input shaft 2) by a speed ratio $e_2^*$; another multiplier 202 which multiplies the positive potential $n_e$ by a speed ratio $e_1^*$; a comparator 203 which compares the positive output potential $n_e \cdot e_2^*$ from the multiplier 201 against a positive output potential $n_d$ which is produced by a sensor $S_2$ which is mounted on the output shaft 10 to detect the number of revolutions; and another comparator 204 which compares the positive output potential $n_d$ from the sensor $S_2$ against a positive output potential $n_e \cdot e_1^*$ from the multiplier 202. When $n_e \cdot e_2^* > n_d$, the comparator 203 produces a positive output potential which is applied to transistor T1 contained within a relay drive circuit 205. When $n_d > n_e \cdot e_1^*$, the comparator 204 produces a positive output potential which is applied to transistor T2 contained in another relay drive circuit 208. When a positive potential is applied to transistor T1, a reed relay 206 is energized to close a normally open contact 207. When a positive potential is applied to transistor T2, a reel relay 209 is energized to close a normally open contact 210. Consequently, when a positive potential is applied to both transistors T1 and T2, the both normally open contacts 207, 210 are closed, completing a path C2 which connects the D/A converter 170 with a drive circuit C3 associated with the solenoid valve 220. Thereupon, if a positive potential is produced by the D/A converter, it is applied to transistor T3 contained in a relay drive circuit 211, whereby a reed relay 212 is energized to close a normally open contact 213. When the D/A converter 170 produces a negative potential, it is inverted by an inverter 214 and then applied to transistor T4 contained in a relay drive circuit 215, thereby energizing a reed relay 216 to open a normally closed contact 217. In other words, the clutch control circuit 200 is constructed in a manner such that when the speed ratio e lies within a range from $e_1^*$ to $e_2^*$, the both normally open contact 207, 210 connected in the path C2 are closed to transmit a positive potential from the D/A converter 170 to close the normally open contact 213 in the drive circuit C3, thereby energizing the solenoid 225 associated with the solenoid valve 220. It will be noted that the energization is maintained by an electromagnetic switch 218 connected in the drive circuit C3. When the D/A converter 170 produces a negative potential when the both normally open contacts 207, 210 are closed, the normally closed contact 217 in the drive circuit C3 is opened, interrupting the energization of the solenoid 225 and also opening the switch 218.

The operation of the described system will now be described. When the engine E remains at rest, the solenoid 225 of the solenoid valve 220 is not energized, whereby this valve establishes a communication between the oil paths P17 and P16 on one hand and the oil path P2 and reservoir Re, respectively. Consequently, when the manual shift valve 20 shown in FIG. 1 is shifted to its neutral position to start the engine E, the hydraulic pump P shown in FIG. 1 operates to supply the line pressure to the oil path P2, which is transmitted through the solenoid valve 220 and the oil path P17 to be applied to the low range clutch LC, thus operating it. The line pressure of the oil path P2 is also supplied to the bypass clutch valve 50 through the manual shift valve 20 and the oil path P3, whereby the bypass clutch valve 50 establishes a communication between the oil paths P8 and P9, establishing a neutral position of the hydro-mechanical transmission H. Subsequently, when the manual shift valve 20 is shifted to its forward position in order to run the vehicle in the forward direction, the line pressure of the oil path P2 is fed through the oil path P4 to the actuator 30, which therefore operates to establish a meshing engagement between the dog gears 4a and 5a of the hydro-mechanical transmission H. The line pressure of the oil path P3 is discharged to the reservoir Re through the manual shift valve 20. The polarity inverter 400 operates to transmit an output from the D/A converter 170 directly to the servo amplifier 350 without changing its polarity.

Until an accelerator pedal is depressed subsequently, a negative potential is applied to the servo valve 360, which provides a communication between the oil paths P23 and P22 on one hand and the oil path P2 and reservoir Re, respectively, thus operating the actuator AC to establish a discharge volume V of the first hydraulic pump moter M1 which is equal to $-V_M$ and hence a speed ratio e which is zero.

When the accelerator pedal is depressed to increase a throttle opening of the engine, a positive output potential from the potentiometer PM is reduced to increase the target fuel injection duration which is indicated by an output code from the target function generator 150. In response to an increase in the throttle opening, the quantity of intake air increases, and this is sensed by EFI, which in turn increases the fuel injection to increase the torque from the engine, thus increasing the rotational speed of the engine. Fuel injection quantity which is determined by EFI depends on a value obtained from dividing the quantity of intake air with the rotational speed of the engine. Therefore the actual fuel injection quantity decreases when the rotational speed of the engine increases. Hence, the actual fuel injection duration which is indicated by an output code from the digitizer 100 decreases. Accordingly, a negative output potential from the D/A converter 170 gradually decreases until the actual duration becomes less than the target duration whereupon an output from the D/A converter 170 will be a positive potential having a magnitude which depends on the difference therebetween. This positive potential is supplied through the polarity inverter 400 to the servo amplifier 350, whereby the servo valve 360 establishes a communiction between the oil paths P22 and P23 on one hand and the oil path P2 and reservoir Re on the other, respectively, and the actuator AC causes the discharge volume V of the first hydraulic pump motor M1 to increase toward $+V_M$.

Hence, the speed ratio e begins to increase. At this point, the bypass clutch valve 50 has already interrupted the connection between the oil paths P8 and P9, so that a power transmission occurs between the engine and the drive wheels of the vehicle, presenting a load on the engine E and causing the vehicle to start. The speed ratio e continues to increase until the output potential of the D/A converter 170 reaches zero. If the output of the D/A converter 170 is a positive potential when the speed ratio e reaches the level of $e_1^*$, the normally open contact 213 in the clutch control circuit 200 is closed to energize the solenoid 225, whereby the solenoid valve 220 communicates the oil path P16 with the oil path P2 to operate the high range clutch HC. It also communicates the oil path P17 with the reservoir Re to disengage the low range clutch LC. At the same time, the polarity inverter 400 supplies an output of the D/A converter 170 as inverted in polarity to the servo amplifier 350, whereby the servo valve 360 is supplied with a negative potential and hence establishes the communication between the oil paths P22 and P23 on one hand and the oil path P2 and reservoir Re on the other, respectively, operating the actuator Ac and causing the discharge volume V of the first hydraulic pump matter M1 to change toward $-V_M$. Thus the speed ratio e increases. The solenoid 225 is maintained energized by the closed switch 218 even though the normally open contact 213 is opened again when the speed ratio e exceeds the level $e_2^*$.

When the throttle opening is reduced while the speed ratio e is greater than the level of $e_2^*$, a positive output potential from the potentiometer PM increases, and the target fuel injection duration provided by the target function generator 150 decreases. This causes the D/A converter 170 to produce a positive output potential, and hence a negative potential is applied to the servo valve 360 to increase the speed ratio. This increases the load on the engine and reduces the rotational speed thereof, increasing the actual fuel injection duration. As the positive output potential from the D/A converter 170 gradually decreases and the actual duration exceeds the targe duration, the output from the D/A converter 170 changes to a negative potential, whereby a positive potential is applied to the servo valve 360 to reduce the speed ratio e. The speed ratio e continues to descrease until the output potential of the D/A converter 170 reaches zero. If the output of the D/A converter 170 remains to be a negative potential when the speed ratio e reaches the level of $e_2^*$, the normally closed contact 217 of the clutch control circut 200 is opened to deenergize the solenoid 225, whereby the solenoid valve 220 communicates the oil path P17 with the oil path 2 to operate the low range clutch LC. It also communicates the oil path P16 with the reservoir Re to deactuate the high range clutch HC. Simultaneously, the polarity inverter 400 passes the output of the D/A converter 170 to the servo amplifier 350 without changing the polarity. A negative potential continues to be applied to the servo valve 360, thus reducing the speed ratio e.

When the manual shift valve 20 is shifted to its reverse position when the speed ratio e is zero, the line pressure of the oil path P2 is supplied to the actuator 30 through the oil path P5, whereby the gear 4 of the hydromechanical transmission H meshes with the gear 6. At the same time, the polarity inverter 400 inverts the polarity of the output from the D/A converter 170 before it is applied to the servo amplifier 350. Until the accelerator pedal is depressed, the output from the D/A converter 170 remains negative, so that a positive potential is applied to the servo valve 360 and the actuator AC causes the discharge volume of the first hydraulic pump matter M1 to increase to $+V_M$, thus maintaining a zero speed ratio.

In the embodiment described above, the target function generator 150 produced a target fuel injection which corresponds to a throttle opening $\Theta$, but alternatively it may produce a target fuel injection which corresponds to the rotational speed of the engine. In this instance, referring to FIG. 3, the target function generator 150 may be supplied with an output of the F/V converter 180 to read a target fuel injection corresponding to the rotational speed of the engine from the read only memory 153. Again, the operating condition of the engine E is controlled by the fuel injection signal from the EFI, so that a rapid response in the control of the speed ratio is achieved.

As discussed above, the speed ratio control system is operated in accordance with the speed ratio controlling signal which is derived by comparing a target fuel injection against an actual fuel injection which is derived from the fuel injection signal supplied by the EFI. Hence, there is no need to provide any special sensor in order to detect the operating condition of the engine. Because the speed ratio is controlled in accordance with the fuel injection, or a difference between the target fuel injection corresponding to a target torque and the actual fuel injection which is substantially proportional to the torque from the engine, the operating performance is greatly improved as compared with a control system in which a target speed of rotation is preset. The control system cooperates with the control of the fuel injection by the EFI, providing a further contribution to reducing the toxious components contained in the exhaust gas.

While the embodiment dealt with a hydro-mechanical transmission, it should be understood that the invention is equally applicable to other types of stepless variable speed transmissions.

What is claimed is:

1. A speed ratio control system for a stepless variable speed transmission associated with a vehicle comprising means for producing a first signal indicative of a fuel injection duration in response to a fuel injection control signal supplied by an electronic fuel injection system, means for producing a second signal indicative of a target fuel injection which corresponds to a throttle opening of an engine, and means for comparing the first and the second signal to produce a speed ratio controlling signal which is used to control the speed ratio of the stepless variable speed transmission until the fuel injection indicated by the fuel injection signal from the electronic fuel injection system becomes equal to the target fuel injection quantity.

2. A speed ratio control system for a stepless variable speed transmission associated with a vehicle as set forth in claim 1, wherein the means for producing the first signal includes an AND gate element which is applied with the fuel injection control signal and clock pulses, a counter which is applied with the output pulses of the AND gate, a heading edge detector which generates a pulse at a leading edge of the fuel injection control signal to clear the counter, a latch element which is applied the output count code of the counter and a trailing edge detector which generates a pulse at a trailing edge of the fuel injection control signal; and the means for producing the second signal includes a read only memory unit which has memory data which represent target fuel injection durations corresponding to the throttle positions of the engine and signal converter means which converts a throttle position indication signal into an address code of the read only memory unit.

3. A speed ratio control system for a stepless variable speed transmission associated with a vehicle as set forth in claim 2, wherein the means for comparing the first and the second signal includes an adder-subtractor which is applied the fuel injection duration code from the latch element and the target fuel injection duration code from the read only memory device, and generates a code which represents the difference between the fuel injection duration and the target fuel injection duration; and a digital to analog converter which converts the output code of the adder-subtractor into analog signal.

4. A speed ratio control system for a stepless variable speed transmission associated with a vehicle comprising means for producing a first signal indicative of a fuel injection duration in response to a fuel injection control signal supplied by an electronic fuel injection system, means for producing a second signal indicative of a target fuel injection which corresponds to a rotational speed of an engine, and means for comparing the first and the second signal to produce a speed ratio controlling signal which is used to control the speed ratio of the stepless variable speed transmission until the fuel injection indicated by the fuel injection signal from the electronic fuel injection system becomes equal to the target fuel injection quantity.

5. A speed ratio control system for a stepless variable speed transmission associated with a vehicle as set forth in claim 1, wherein the means for producing the first signal includes an AND gate element which is applied with the fuel injection control signal and clock pulses, a counter which is applied with the output pulses of the AND gate, a leading edge detector which generates a pulse at a leading edge of the fuel injection control signal to clear the counter, a latch element which is applied the output count code of the counter and a trailing edge detector which generates a pulse at a trailing edge of the fuel injection control signal; and the means for producing the second signal includes a read only memory unit which has memory data which represent target fuel injection durations corresponding to the rotational speeds of the engine and signal converter means which converts a rotational speed indication signal into an address code of the read only memory unit.

6. A speed ratio control system for a stepless variable speed transmission associated with a vehicle as set forth in claim 2, wherein the means for comparing the first and the second signal includes an adder-subtractor which is applied the fuel injection duration code from the latch element and the target fuel injection duration code from the read only memory device, and generates a code which represents the difference between the fuel injection duration and the target fuel injection duration; and a digital to analog converter which converts the output code of the adder-subtractor into analog signal.

* * * * *